UNITED STATES PATENT OFFICE.

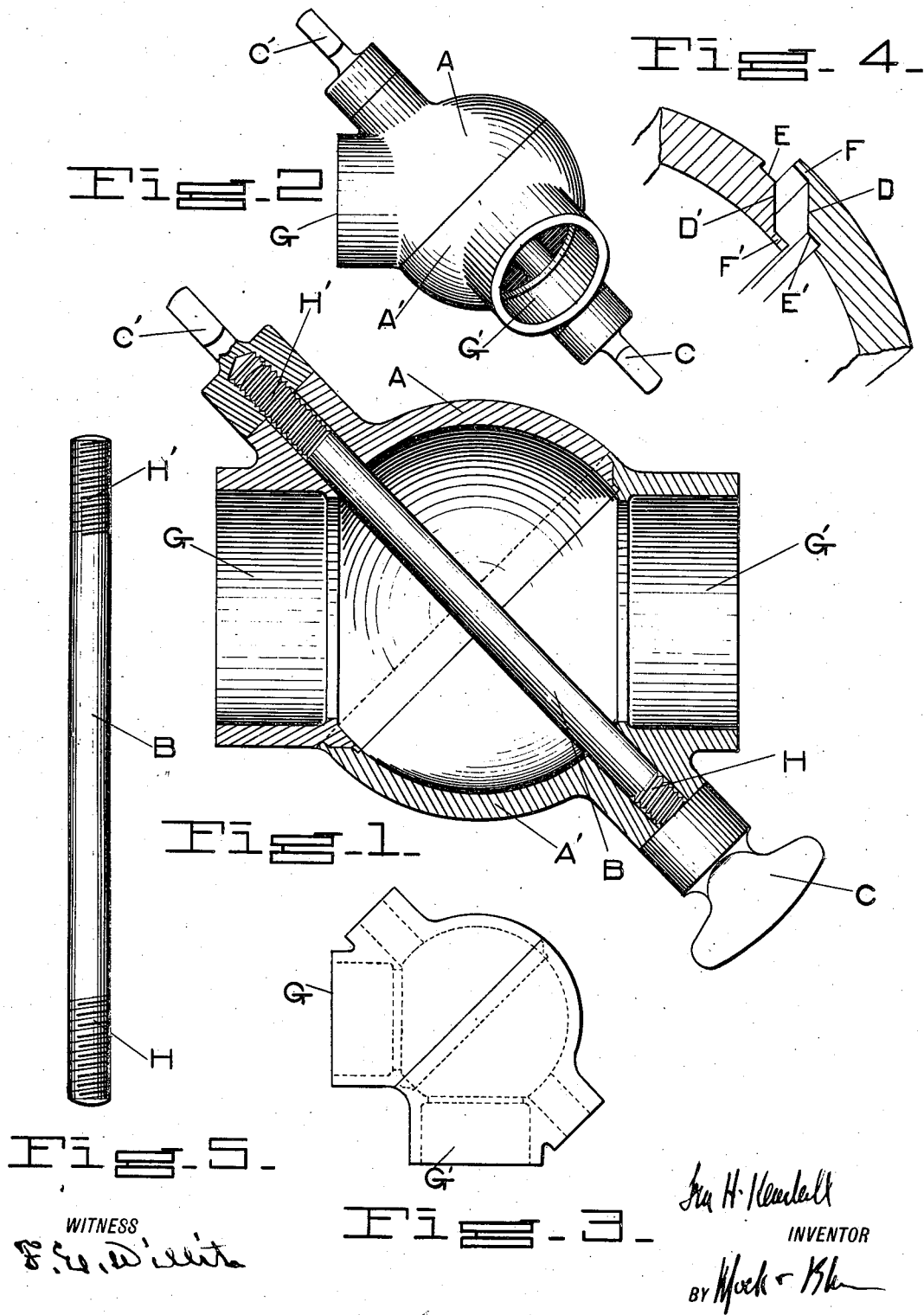

IRA HUNT KENDALL, OF POTSDAM, NEW YORK.

SANITARY FITTING OR COUPLING FOR PIPES.

1,301,453.	Specification of Letters Patent.	Patented Apr. 22, 1919.

Application filed July 20, 1918. Serial No. 245,905.

*To all whom it may concern:*

Be it known that I, IRA H. KENDALL, a citizen of the United States, residing at Potsdam, in the county of St. Lawrence and State of New York, have invented certain new and useful Improvements in Sanitary Fittings or Couplings for Pipes, of which the following is a specification.

My invention relates to a sanitary fitting or coupling for pipes used in conveying liquids and more particularly for pipes used in creameries and other establishments for conveying milk, where the utmost cleanliness must be observed.

Couplings for connecting pipes running in opposite directions are old and well-known. These must be cleaned frequently in creameries and other establishments where a high standard of cleanliness is obsolutely necessary. To accomplish this cleaning, a brush from six to twelve feet in length and having a long wire handle is used. To secure the highest degree of cleanliness, these couplings are made with a ground joint so as to avoid the need of gaskets, etc., and only a short period of use of these brushes wears away these joints in the couplings now known, so that these couplings are no longer tight after a short period of use.

The object of my invention is to secure a sanitary fitting which will depend upon a ground joint for its tightness, without any packing or the like, and in which the joint shall be so placed that it will not be affected by the grinding of the wire handle of the cleaning brush now in ordinary use.

Other objects of my invention will be disclosed in the following description and drawings which illustrate a preferred embodiment thereof.

Figure 1 is a central vertical section with some of the parts in elevation.

Fig. 2 is a perspective view.

Fig. 3 is a side elevation of the two coupling members.

Fig. 4 is an enlarged sectional view of the joint between the coupling members.

Fig. 5 is a perspective view of the bolt which connects the coupling members.

The device consists essentially of coupling members A and A' which have a general hemispherical contour and are provided with cylindrical projections G and G' for connecting together pipes that may be joined thereto, and with threaded radial cylindrical projections, which are on the same diameter so that a bolt B having threaded ends H and H' may fit into the two last mentioned projections, said threaded ends H and H' projecting from the couplings and being secured by members C and C', both of which may be wing-nuts. If desired, one of them can be an ordinary lock-nut or the like or be made integral with the bolt itself.

The joint between the coupling members A and A' is more particularly shown in Fig. 4. As can be seen from this figure, members A and A', are respectively ground on the surfaces D' and D, and these ground surfaces are adjacent lips E and F, and F' and E'. These lips have cylindrical faces parallel to bolt B, and disk-like faces perpendicular thereto.

This joint is so ground that the faces D' and D, as well as said lips are identical in dimensions and all other respects, so that as shown in Fig. 1, when the coupling members A and A' are forced together by means of the bolt B and the locking members C and C', both halves of the said ground joint will register perfectly and form an absolutely tight joint and closure. As shown in Figs. 1 and 4, the centers of faces D and D' are on opposite ends of a diameter of the interior spherical part of a coupling, and these faces D and D' are inclined at substantially 45 degrees to the axis of the bolt B.

As can be seen in Fig. 1, the end disk-like faces of the said lips are perpendicular to the axis of the bolt B. By means of this, when the coupling members A and A' are strongly forced together, a very tight joint is formed and if desired, by loosening the locking members co-acting with the bolt B, either one of the coupling members can be revolved about the bolt B as a pivot, and then refastened in any other position desired, while a perfectly tight joint will be maintained.

This is illustrated in the drawings in which the coupling members are shown in different relative positions in Figs. 1 and 2.

Experience has shown that this form of joint is perfectly tight and requires no packing, is efficient in all positions of the coupling members and is not worn out by the wire handle of the cleaning brush. It thus obviates one of the vexatious annoyances heretofore present in this type of coupling, and presents marked economies both in preventing loss of the fluid passing through the coupling and also in the cost of maintenance.

I have shown a preferred embodiment of my invention in which the coupling members have ground faces embodying the conical faces D and D' which are equally inclined toward the axis of the bolt B, and the cylindrical faces E and F and F' and E' and the disk-like faces above and below the said cylindrical faces, the said ground face of each coupling member being symmetrically disposed with respect to the diameter passing through the center of the coupling, and perpendicular to the axis of the bolt B.

However, changes and omissions may be made in this ground joint so formed, as well as in the other parts of my invention, without departing from its spirit.

I claim:—

1. In a pipe coupling, coupling members having parts thereof shaped like a sphere of the same radius, and means for forcing the said coupling members together along a diameter of the said sphere, the said coupling members having ground conical faces which are parallel to each other, the axes of the said conical faces being coincident with the said diameter, the said conical faces being symmetrically disposed with respect to a diameter perpendicular to the first mentioned diameter.

2. In a pipe coupling, coupling members having parts thereof shaped like a sphere of the same radius, and means for forcing said coupling members together along a diameter of the said sphere, the said coupling members each having ground conical faces equally inclined to a diameter perpendicular to the first mentioned diameter, the axes of the said conical faces being coincident with the first-mentioned diameter, the said coupling members having lips comprising cylindrical faces and disk-like faces perpendicular thereto above and below the said conical faces, the axes of the said cylindrical faces being coincident with the said first mentioned diameter, the ground faces of one coupling member having dimensions identical with the adjacent ground faces of the other coupling member.

3. In a pipe coupling, coupling members having parts thereof shaped like a sphere of the said radius, cylindrical projections projecting from the said spherical parts, the faces of the said cylindrical projections being coincident with a diameter of the said sphere, a bolt coincident with the said diameter and having threaded ends projecting from the said cylindrical projections, threaded locking means adapted to co-act with the threaded ends of the said bolt so as to force said coupling members together in the direction of the said bolt, said coupling members each having parallel ground conical faces inclined to the said bolt, the axes of the said conical faces being coincident with the axis of the said bolt, the said conical faces being symmetrically disposed with respect to the diameter perpendicular to the axis of the bolt, said coupling members having lips comprising cylindrical faces and disk-like faces perpendicular thereto above and below the said conical faces, the axes of the said cylindrical faces being coincident with the axis of the said bolt, the ground face of one coupling member having dimensions identical with the ground face of the other coupling member.

In testimony whereof I hereunto affix my signature.

IRA HUNT KENDALL.